(12) United States Patent
Sawas

(10) Patent No.: US 11,372,974 B2
(45) Date of Patent: Jun. 28, 2022

(54) RULE-BASED SYSTEM AND METHOD FOR DETECTING AND IDENTIFYING TAMPERING IN SECURITY ANALYSIS OF SOURCE CODE

(71) Applicant: Saudi Arabian Oil Company, Dhahran (SA)

(72) Inventor: Adnan Mustafa Sawas, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 636 days.

(21) Appl. No.: 16/291,844

(22) Filed: Mar. 4, 2019

(65) Prior Publication Data

US 2020/0285742 A1 Sep. 10, 2020

(51) Int. Cl.
*G06F 21/56* (2013.01)
*G06F 21/54* (2013.01)
*G06F 21/55* (2013.01)
*G06F 21/57* (2013.01)

(52) U.S. Cl.
CPC ............ *G06F 21/563* (2013.01); *G06F 21/54* (2013.01); *G06F 21/554* (2013.01); *G06F 21/577* (2013.01)

(58) Field of Classification Search
CPC ...... G06F 21/563; G06F 21/54; G06F 21/554; G06F 21/577; H04L 63/1433
See application file for complete search history.

(56) References Cited

U.S. PATENT DOCUMENTS

| 8,613,080 | B2 | 12/2013 | Wysopal et al. |
| 2009/0038014 | A1* | 2/2009 | Force .................... G06F 21/577 726/25 |
| 2011/0173693 | A1 | 7/2011 | Wysopal et al. |
| 2014/0283081 | A1 | 9/2014 | Sheridan |
| 2016/0099962 | A1* | 4/2016 | Peach ................. H04L 63/1433 726/25 |
| 2017/0357809 | A1 | 12/2017 | Smith |
| 2019/0362076 | A1* | 11/2019 | Wang ..................... G06F 21/44 |

OTHER PUBLICATIONS

International Search Report and Written Opinion in Corresponding Patent Application PCT No. PCT/US2020/019611 dated May 15, 2020. 11 pages.

\* cited by examiner

*Primary Examiner* — Paul E Callahan
(74) *Attorney, Agent, or Firm* — Leason Ellis LLP

(57) ABSTRACT

A system, a method, and a computer program are provided for analyzing a security scanning analysis for source code in a computing resource to detect an alteration event in the security scanning analysis. The method includes receiving, by an alteration event processor, the security scanning analysis for the computing resource, parsing data, by the alteration event processor, from a plurality of fields in the security scanning analysis, analyzing the parsed data, by the alteration event processor, to detect whether the security scanning analysis includes an alteration event. determining, by the alteration event processor, that the security scanning analysis includes the alteration event, and linking, by the alteration event processor, the alteration event with the computing resource before the computing resource is made available to a client device in a network.

10 Claims, 12 Drawing Sheets

```xml
<?xml version="1.0" encoding="utf-8"?>
<AssessmentRun name="eReview" version="9.0.3.5">
    <AssessmentStats class_total="0" date="1520248379" duration="0" error_status="0" language_type=
    "4" line_total="7982" max_vdensity="11.06847" max_vkloc="1.190118" method_total="0"
    total_call_sites="1574" total_call_sites_information="0" total_call_sites_not_vulnerable="90"
    total_excluded_findings="0" total_files="97" total_findings="73" total_high_finding="73"
    total_high_high_finding="0" total_high_low_finding="0" total_high_med_finding="0"
    total_low_finding="4" total_low_high_finding="0" total_low_low_finding="4" total_low_med_finding
    ="0" total_med_high_finding="18" total_med_high_finding="0" total_med_low_finding="0"
    total_med_med_finding="15" vdensity="11.06847" vkloc="1.190118"/>
    <AssessmentConfig analysis_type="2" assessment_type="1" stop_on_error="false">
    <SharedDataStats total_objects="515"/>
    <StringPool>
    <FilePool>
    <SitePool>
    <PaintPool>
    <FindingDataPool>
    <Assessment assessee_file=
    "D:\Users\momename\eReview\eReviewProject_11122017085716\eReview\eReviewProject\eReview\eReview\app\eReview.sln"
    assessee_name="eReview" assessee_type="Application">
    <Messages>
    <MetricsFindings>
    </MetricsFindings>
</AssessmentRun>
```

FIG. 4A

```xml
<?xml version="1.0" encoding="UTF-8"?>
<AssessmentRun name="eReview" version="9.0.3.5">
  <AssessmentStats class_total="0" date="152028379" duration="0" error_status="0" language_type="4" line_total="79824" max_vdensity="11.066847" max_vloc="1.190118" method_total="0" total_call_sites="15741" total_call_sites_informational="0" total_call_sites_not_vulnerable="90" total_excluded_findings="0" total_files="97" total_findings="95" total_high_finding="73" total_high_high_finding="0" total_high_low_finding="73" total_high_med_finding="0" total_low_finding="4" total_low_high_finding="0" total_low_low_finding="0" total_low_med_finding="4" total_med_finding="18" total_med_high_finding="0" total_med_low_finding="0" total_med_med_finding="3" total_med_med_finding="15" vdensity="11.066847" vloc="1.190118"/>
  <AssessmentConfig analysis_type="2" assessment_type="1" stop_on_error="false"/>
  <SharedDataStats total_objects="515"/>
  <StringPool/>
  <FilePool/>
  <SitePool/>
  <TaintPool/>
  <FindingDataPool/>
  <Assessment assessee_file=
  "D:\Users\moename\eReview\eReviewProject_11220170857l6\eReview\eReviewProject\eReviewWebApp\eReview.sln"
  assessee_name="eReview" assessee_type="Application")
  <Messages>
  <MetricsFindings>
  </MetricsFindings>
</AssessmentRun>
```

```xml
<?xml version="1.0" encoding="UTF-8"?>
<AssessmentRun name="eReview" version="9.0.3.5">
    <AssessmentStats class_total="0" date="1520248379" duration="0" error_status="0" language_type="4" line_total="79824" max_vdensity="11.066847" max_vkloc="1.190118" method_total="0" total_call_sites="15741" total_call_sites_informational="0" total_call_sites_not_vulnerable="90" total_excluded_findings="0" total_files="97" total_findings="95" total_high_finding="73" total_high_high_finding="0" total_high_low_finding="73" total_high_med_finding="0" total_low_finding="4" total_low_high_finding="0" total_low_low_finding="4" total_low_med_finding="0" total_med_finding="18" total_med_high_finding="15" vdensity="11.066847" vkloc="1.190118">
    <AssessmentConfig analysis_type="2" assessment_type="1" stop_on_error="false"/>
    <SharedDataStats total_objects="515"/>
    <StringPool>
    <FilePool>
    <SitePool>
    <TaintPool>
    <FindingDataPool>
    <Assessment assessee_file=
    "D:\Users\momerama\eReview\eReviewProject_1112201708572\eReview\eReviewProject\eReview\eReviewWebApp\eReview.sln"
    assessee name="eReview" assessee_type="Application">
    <Messages>
    <MetricsFindings>
    </MetricsFindings>
</AssessmentRun>
```

FIG. 4C

```
<Message timestamp="03/05/18 14:15:24" type="AssessmentStatus">Scanned application
eReview ; Total files: 97 Total findings: 95 Total lines: 79824 vkloc: 1.190118
v-density: 11.066847</Message>
<Message timestamp="03/05/18 14:15:24" type="AssessmentStatus">Scan completed: Total
files: 97 Total findings: 95 Total lines: 79824 vkloc: 1.190118 v-density: 11.066847
</Message>
```

FIG. 4D

```
<?xml version="1.0" encoding="UTF-8"?>
<AssessmentRun name="eReview" version="9.0.3.5">
  <AssessmentStats class_total="79824" max_vdensity="11.066847" max_vkloc="1.190118" method_total="0"
    "0" line_total="79824" max_vdensity="11.066847" max_vkloc="1.190118" method_total="0"
    total_call_sites="15741" total_call_sites_informational="0" total_call_sites_not_vulnerable="90"
    total_excluded_findings="0" total_files="97" total_findings="95" total_high_finding="73"
    total_high_high_finding="0" total_high_low_finding="0" total_high_med_finding="0" total_low_med_finding
    ="0" total_low_finding="4" total_low_high_finding="0" total_low_low_finding="4" total_med_low_finding="3"
    total_med_med_finding="18" total_med_high_finding="0" total_med_med_finding="0" total_med_low_finding="3"
    ="0" total_med_med_finding="15" vdensity="11.066847" vkloc="1.190118"/>
  <AssessmentConfig analysis_type="2" assessment_type="1" stop_on_error="false")
  <SharedDataStats total_objects="515"/>
```

FIG. 4E

```
<AssessmentRun name="eReview" version="9.0.3.5">
  <AssessmentStats class_total="0" date="1520248379" duration="0" error_status="0" language_type=
  "4" line_total="79824" max_vdensity="11.066847" max_vkloc="1.190118" method_total="0"
  total_call_sites="15741" total_call_sites_informational="0" total_call_sites_not_vulnerable=
  "90" total_excluded_findings="0" total_files="97" total_findings="95" total_high_finding="73"
  total_high_high_finding="0" total_high_low_finding="73" total_high_med_finding="0"
  total_low_finding="4" total_low_high_finding="0" total_low_low_finding="4"
  total_low_med_finding="0" total_med_finding="18" total_med_high_finding="0"
  total_med_low_finding="3" total_med_med_finding="15" vdensity="11.066847" vkloc="1.190118"/>
  <AssessmentConfig analysis_type="2" assessment_type="1" stop_on_error="false"/>
  <SharedDatastats total_objects="515"/>
  <StringPool>
  <FilePool>
  <SitePool>
  <MainPool>
    <FindingDataPool>
      <FindingData ao_id="440219" conf="3" id="1" project_name="169" project_id="509" rec_id=
      "1083853" rev="2" site_id="9" vtype="143"/>
      <FindingData ao_id="111420" conf="3" id="2" project_name="169" prop_id="542,570,605,1099"
      rec_id="562373" rev="1" site_id="5" vtype="140"/>
      <FindingData ao_id="120549" conf="3" id="3" project_name="169" prop_id="542,570,605,1099"
      rec_id="571353" rev="1" site_id="6" vtype="140"/>
      <FindingData ao_id="110487" conf="3" id="4" project_name="169" prop_id="570,605,1099"
      rec_id="561466" rev="1" site_id="7" vtype="140"/>
      <FindingData ao_id="379221" conf="3" id="5" project_name="169" prop_id=
      "3,540,558,571,605,923,1099" rec_id="564644" rev="0" site_id="8" vtype="139"/>
      <FindingData ao_id="379221" conf="3" id="9" project_name="169" prop_id=
      "3,540,558,571,605,923,1099" rec_id="564644" rev="0" site_id="9" vtype="139"/>
```

FIG. 4F

```
<?xml version="1.0" encoding="utf-8"?>
<AssessmentRun name="eReview" version="9.0.3.5">
    <AssessmentStats class_total="0" date="1520248379" duration="0" error_status="0" language_type=
"4" line_total="79824" max_vdensity="11.066847" max_vkloc="1.190118" method_total="0"
total_call_sites="15741" total_call_sites_informational="0" total_call_sites_not_vulnerable="90"
total_excluded_findings="0" total_files="97" total_findings="95" total_high_finding="73"
total_high_high_finding="0" total_high_low_finding="0" total_low_med_finding="0"
total_low_finding="4" total_low_high_finding="0" total_low_low_finding="4" total_low_med_finding
="0" total_med_finding="18" total_med_high_finding="0" total_med_low_finding="3"
total_med_med_finding="15" vdensity="11.066847" vkloc="1.190118">
    <AssessmentConfig analysis_type="2" assessment_type="1" stop_on_error="false">
```

FIG. 4G

```
<Message timestamp="03/05/18 14:15:24" type="AssessmentStatus">Scan completed: total
files: 97 Total findings: 95 Total lines: 79824 vkloc: 1.190118 v-density: 11.066847
</Message>
```

FIG. 4H

```
<AssessmentStats class total="0" date="1520248379" duration="0" error_status="0" language_type=
"4" line_total="79824" max_vdensity="11.066847" max_vkloc="1.190118" method_total="0"
total_call_sites="15741" total_call_sites_informational="0" total_call_sites_not_vulnerable="90"
total_excluded_findings="0" total_files="0" total_findings="97" total_high_finding="73"
total_high_high_finding="0" total_high_low_finding="73" total_high_med_finding="0"
total_low_finding="4" total_low_high_finding="0" total_low_low_finding="4" total_low_med_finding
="0" total_med_finding="18" total_med_high_finding="0" total_med_low_finding="3"
total_med_med_finding="15" vdensity="11.066847" vkloc="1.190118">
<AssessmentConfig analysis_type="2" assessment_type="1" stop_on_error="false">
```

FIG. 4I

```
<Message timestamp="03/05/18 14:15:24" type="AssessmentStatus">Scan completed: Total
files: 97 Total findings: 95 Total lines: 79824 vkloc: 1.190118 v-density: 11.066847
</Message>
```

FIG. 4J

```
<AssessmentStats class total="0" date="1520248379" duration="0" error_status="0" language_type=
"4" line_total="79824" max_vdensity="11.066847" max_vkloc="11.066847" method_total="0"
total_call_sites="15741" total_call_sites_informational="0" total_call_sites_not_vulnerable="90"
total_excluded_finding="0" total_files="97" total_findings="95" total_high_finding="73"
total_high_high_finding="0" total_high_low_finding="73" total_high_med_finding="0"
total_low_finding="4" total_low_high_finding="0" total_low_low_finding="4" total_low_med_finding
="0" total_med_finding="18" total_med_high_finding="0" total_med_low_finding="0"
total_med_med_finding="15" vdensity="11.066847" vkloc="1.190118"/>
<AssessmentConfig analysis_type="2" assessment_type="1" stop_on_error="false">
```

FIG. 4K

```
<FindingDataPool>
  <FindingData ao_id="448219" conf="3" id="1" project_name="169" prop_id="589" rec_id=
  "1083853" sev="2" site_id="2" vtype="143"/>
  <FindingData ao_id="111420" conf="3" id="2" project_name="169" prop_id="542,570,605,1099"
  rec_id="562373" sev="1" site_id="5" vtype="140"/>
  <FindingData ao_id="120549" conf="3" id="3" project_name="169" prop_id="542,570,605,1099"
  rec_id="571353" sev="1" site_id="6" vtype="140"/>
  <FindingData ao_id="110487" conf="3" id="4" project_name="169" prop_id=
  "570,605,1099" rec_id="561466" sev="1" site_id="7" vtype="140"/>
  <FindingData ao_id="379221" conf="3" id="5" project_name="169" prop_id=
  "3,540,558,571,605,923,1099" rec_id="564644" sev="0" site_id="8" vtype="139"/>
```

FIG. 4L

RULE-BASED SYSTEM AND METHOD FOR DETECTING AND IDENTIFYING TAMPERING IN SECURITY ANALYSIS OF SOURCE CODE

FIELD OF THE DISCLOSURE

The present disclosure relates to a system, a method, and a computer program for detecting and identifying tampering in security analysis of source code, including rules-based analysis of source code scan results and authentication of results.

BACKGROUND OF THE DISCLOSURE

Network systems are continuously under attack, and applications are frequently targets of attack. Therefore, applications are a crucial part when it comes to network security. In efforts to prevent or minimize cyberattacks, it is common practice to employ source code scanning tools to detect vulnerabilities and weaknesses in applications source code. These tools are used by developers during the development life cycle of applications to detect and counter source code weaknesses in early stages. The source code scanning tools typically generate security scanning analyses that are reviewed by developers and security analysts before applications are released into the production environment.

The security scanning analyses generated by source code scanning tools are typically file-based and can be easily changed or tampered with. Since reviewers generally do not have access to the original files, it is not possible for them to determine whether any security scan results in a security scanning analysis have been altered or tampered with. There exists an unfulfilled need for a technology solution that can detect and identify alterations to or tampering with security scan results in a security scanning analysis.

SUMMARY OF THE DISCLOSURE

The disclosure provides a novel technology solution, including a method, a system, and a computer program for detecting alterations to or tampering with security scan results in a security scanning analysis received from a source code scanning tool. According to an aspect of the disclosure, a system is provided that analyzes a security scanning analysis for source code in a computing resource to detect an alteration event in the security scanning analysis. The system comprises an alteration event processor that receives the security scanning analysis for the computing resource, parses security scan results data from a plurality of fields in the security scanning analysis, analyzes the security scan results data; detects whether the security scanning analysis includes an alteration event, generates alteration event data for a detected alteration event, and links the alteration event data with the computing resource before the computing resource is made available to a client device in a network.

The alteration event processor can include a date comparator that receives a date value from the parsed data and compares the date value to a threshold value to detect the alteration event.

The alteration event processor can include a line number comparator that receives a total lines scanned value from the parsed data and compares the total lines scanned value to a line number threshold or data in a field in the security scanning analysis to detect the alteration event.

The alteration event processor can include a field number comparator that receives a total fields scanned value from the parsed data and compares the total files scanned value to a file number threshold or data in a field in the security scanning analysis to detect the alteration event.

The alteration event processor can include a vulnerability sum determiner that receives a total findings value from the parsed data and compares the total findings value to a breakdown of one or more security scan results in the security scanning analysis to detect the alteration event.

The alteration event processor can include a sum-type comparator that receives summary data from the parsed data and compares the summary data to a breakdown of one or more security scan results in the security scanning analysis to detect the alteration event.

The alteration event processor can include a vulnerability frequency comparator that receives a vulnerability frequency value from the parsed data and compares the vulnerability frequency value to vulnerability frequency data in a field in the security scanning analysis to detect the alteration event.

The alteration event processor can include a vulnerability density comparator that receives a vulnerability density value from the parsed data and compares the vulnerability density value to vulnerability density data in a field in the security scanning analysis to detect the alteration event.

The alteration event processor can include an exceptions determiner that receives an excluded findings value from the parsed data or that checks data in each exclusion field in the security scanning analysis, wherein the exceptions determiner compares the excluded findings value to an exceptions threshold or detects an exclusion attribute to detect the alteration event, and wherein the exclusion attribute is set to TRUE.

According to a further aspect of the disclosure, a method is provided for analyzing a security scanning analysis for source code in a computing resource to detect an alteration event in the security scanning analysis. The method comprises: receiving, by an alteration event processor, the security scanning analysis for the computing resource; parsing data, by the alteration event processor, from a plurality of fields in the security scanning analysis; analyzing the parsed data, by the alteration event processor, to detect whether the security scanning analysis includes an alteration event; determining, by the alteration event processor, that the security scanning analysis includes the alteration event; and linking, by the alteration event processor, the alteration event with the computing resource before the computing resource is made available to a client device in a network.

Analyzing the parsed data can include receiving a date value from the parsed data; comparing the date value to a threshold value to detect the alteration event.

Analyzing the parsed data can include receiving a total lines scanned value from the parsed data, and comparing the total lines scanned value to a line number threshold to detect the alteration event.

Analyzing the parsed data can include receiving a total files scanned value from the parsed data, and comparing the total files scanned value to a file number threshold to detect the alteration event.

Analyzing the parsed data can include receiving at least one of a total lines scanned value and a total files scanned value from the parsed data, accessing at least one of total lines scanned data and total files scanned data in a field in the security scanning analysis, and comparing the total lines scanned value or the total files scanned value to the total lines scanned data or the total files scanned data, respectively, to detect the alteration event.

Analyzing the parsed data can include receiving a total findings value from the parsed data and comparing the total findings value to a breakdown of one or more security scan results in the security scanning analysis to detect the alteration event.

Analyzing the parsed data can include receiving summary data from the parsed data and comparing the summary data to a breakdown of one or more security scan results in the security scanning analysis to detect the alteration event.

Analyzing the parsed data can include receiving a vulnerability frequency value from the parsed data, retrieving vulnerability frequency data from a field in the security scanning analysis, and comparing the vulnerability frequency value to the vulnerability frequency data in the security scanning analysis to detect the alteration event.

Analyzing the parsed data can include receiving a vulnerability density value from the parsed data, retrieving vulnerability density data from a field in the security scanning analysis, and comparing the vulnerability density value to the vulnerability density data in the security scanning analysis to detect the alteration event.

Analyzing the parsed data can include receiving an excluded findings value from the parsed data and comparing the excluded findings value to an exceptions threshold to detect the alteration event.

Analyzing the parsed data can include checking data in each exclusion field in the security scanning analysis and detecting the alteration event based on the checked data comprising an exclusion attribute, wherein the exclusion attribute includes a TRUE setting.

According to a still further aspect of the disclosure, a non-transitory computer readable storage medium is provided that stores analysis program instructions for causing a processor to analyze a security scanning analysis for source code in a computing resource to detect an alteration event in the security scanning analysis. The program instructions comprise the steps of: receiving, by an alteration event processor, the security scanning analysis for the computing resource; parsing data, by the alteration event processor, from a plurality of fields in the security scanning analysis; analyzing the parsed data, by the alteration event processor, to detect whether the security scanning analysis includes an alteration event; determining, by the alteration event processor, that the security scanning analysis includes the alteration event; and linking, by the alteration event processor, the alteration event with the computing resource before the computing resource is made available to a client device in a network.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

FIGS. 4A-4L show various views of an example of a UNIX file-based security scanning analysis that can be analyzed by the processing unit in FIG. 2.

Figure 1:
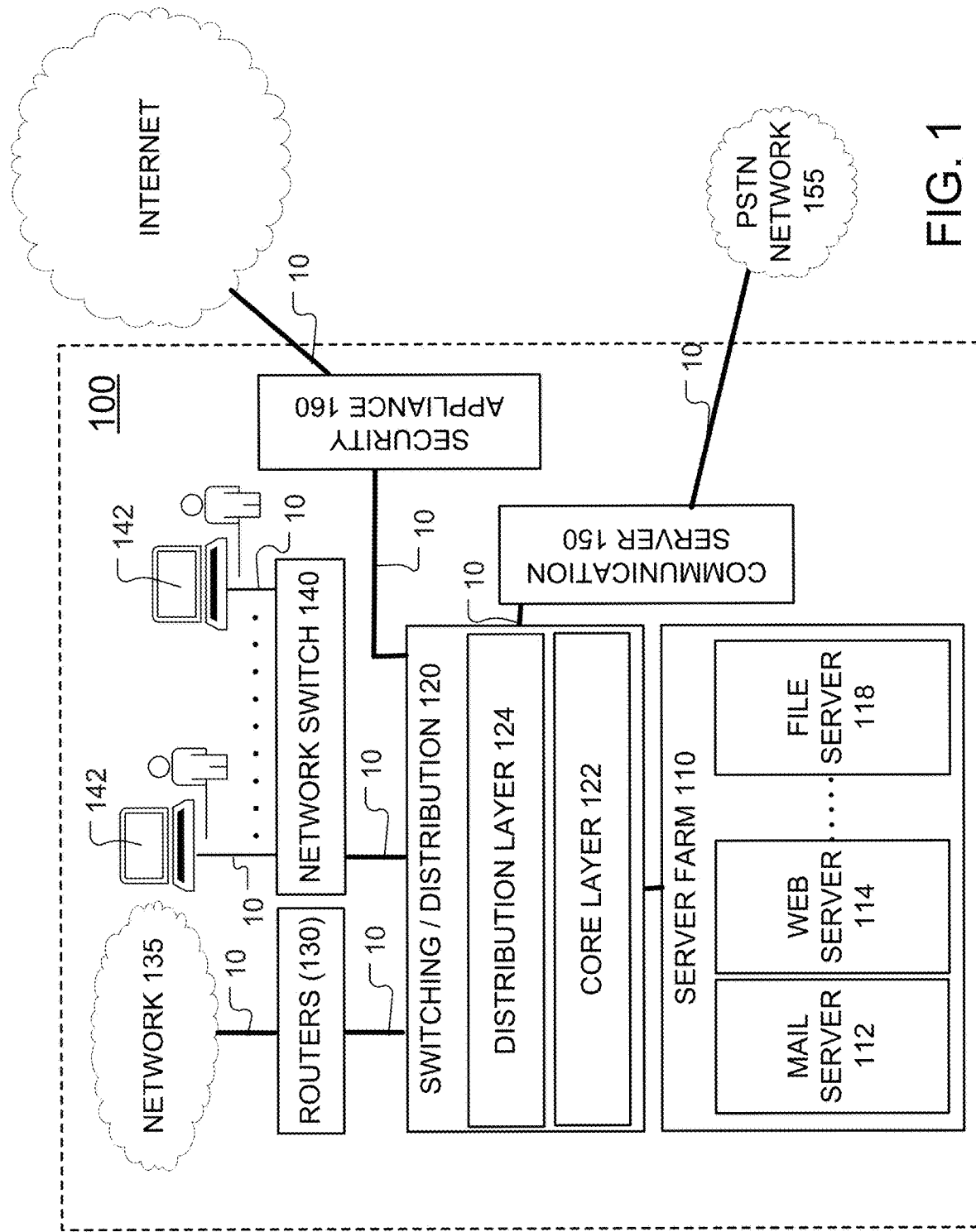
FIG. 1 shows a block diagram of an example of a network system that is constructed according to the principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those skilled in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 shows a non-limiting embodiment of a network system 100 that is constructed according to the principles of the disclosure. The network system 100 can include a server farm 110, switching and distribution layers 120, one or more routers 130, one or more network switches 140, a communication server 150, and a security appliance 160, all of which can be interconnected by communication links 10 and located behind a firewall. The network system 100 can include one or more modems (not shown) configured for one or more cellular network standards, including, but not limited to, for example, GSM, WiMAX, LTE-TDD/TD-LTE, LTE Advanced (E-UTRA), LTE Advanced Pro, HiperMAN, Mobile WiMAX, Flash-OFDM, iBurst, CDMA2000, HSPA, UMTS, WiDEN, GPRS, CDPD, D-AMPS, NMT, AMPS, or the like, or any other modulating/demodulating device that can facilitate transmission of short message services (SMS) messages, or the like, over the public switched telephone network (PSTN), the public land mobile network (PLMN), or the like.

The server farm 110 can include a plurality of servers, including a mail server 112, a web server 114, and a file server 118. The communication server 150, which can be located on an intranet, can be located in the server farm 110. The intranet can include all of the foregoing and a firewall to protect against threats and breach attempts made against the network system 100. The server farm 110 can include large numbers of computing resources that are accessible to the client devices 142 in the network system 100.

The security appliance 160 can include hardware, firmware, or software that provides security analysis and vulnerability detection, malware protection, application visibility and control, reporting, secure mobility, and protection against threats that can arise during connection to communicating devices or the Internet. The security appliance 160 can include a server and a firewall. The security appliance 160 can include one or more security analyzers (not shown), including, for example, Static Application Security Testing (SAST) tools, White-Box Testing tools, SonarQube, Cppcheck, FxCop, BinScope, StyleCop, SecurityAppScan, Nessus, Burp Suite, OpenVAS, Metasploit Project, OWASP ZAP, SAMATE, IBM's AppScan, among many others, which can analyze source code in computing resources before release. The security analyzer(s) (not shown) can evaluate source code in computing resources to detect vulnerabilities and weaknesses in source code and generate a security scanning analysis that includes one or more security scan results that identify each of the detected vulnerabilities and weaknesses. The security analyzer(s) (not shown) can be implemented during a development life cycle of a computing resource to detect and counter source code weaknesses in early stages. To prevent compromises to computing resources, the security appliance 160 can apply remediation, such as, for example, patches or fixes, to the computing resources based on the security scan results in the security scanning analysis for those computing resources.

The security scanning analysis can be generated by a security analyzer and can include one or more security scan results for each vulnerability or weaknesses detected in the analyzed source code. The security scan results can be analyzed by the security appliance 160, or a security analyst via a client device 142 in communication with the security appliance 160, to identify, assess, and/or apply remediation to the vulnerabilities and weaknesses in the source code in the computing resource. The security scanning analysis can be received from the security analyzer in a file-based form, or any other form that facilitates analysis and review of the security scan results in the security scanning analysis by the security appliance 160, or a security analyst via the client device 142 that may be in communication with the security appliance 160. The security appliance 160 can determine whether an alteration event has occurred with respect to a security scan result in the security scanning analysis without analyzing the original data analyzed by the security analyzer. If a determination is made that a security scanning analysis, including all security scan results, is free of any alteration events, the security appliance 160 can authenticate the security scanning analysis and confirm that it is free of alteration events. If, however, a determination is made that a security scanning analysis includes an alteration event, the security appliance 160 can generate and store alteration event data for the alteration event and link the alteration event data with the computing resource that was scanned to generate the analyzed security scanning analysis. The linking process can be carried out before the computing resource can be made available to the client devices 142 in the network system 100.

According to a non-limiting embodiment of the disclosure, any computing resources that have linked alteration event data can be secured from access by any of the client devices 142 until all alteration events in the security scanning analysis for the computing resource have been removed or corrected and the security scanning analysis authenticated as being free of any alteration events.

Since a security scanning analysis that is received in a file-based form from a security analyzer can be easily changed or tampered with, and because the original file(s) may not be available to verify the authenticity of the security scan results in the security scanning analysis, an important unmet need exists for a technological solution that can detect whether an alteration event has occurred without needing access to the original file(s). The disclosed system, method, and computer program provide a technological solution that meets this need, and that can provide network administrators or network owners with a degree of confidence that the security scanning analysis for a computer resource has not be altered or tampered with.

The scanning appliance 160 can evaluate the security scanning analysis by, among other things, comparing security scan results in the security scanning analysis to identify any inconsistencies or signs of data tampering. The security scanning analysis can include segregated security scan results data that can be used to validate other data in the security scanning analysis. If an alteration event is detected, for example, in a specific security scan result in the security scanning analysis, that security scan result can be flagged, and an alteration event data can be generated to describe the alteration event, including its location in the security scanning analysis. Alteration event data for flagged security scan results can be sent to a client device 142 for further analysis to be performed on the security scan results (for example, by a security analyst), or handled internally by the security appliance 160, thereby ensuring the authenticity and integrity of the security scan results. The alteration event data can be sent to the client device 142 together with the entire security scanning analysis. The alteration event data can be linked to the computing resource, and the client device 142 can be provided access to the computing resource. Thus, one or more security scan results in the security scanning analysis can be flagged and made available for further analysis or remediation by the security appliance 160, or the client device 142 that can be in communication with the security appliance 160.

The switching and distribution layers 120 can include a core layer 112 and a distribution layer 124. The core layer 112 can include one or more layers of switching devices (not shown) that connect the server farm 110 to the distribution layer 124. The distribution layer 124 can include one or more layers of switching devices (not shown) that connect the core layer 122 to the one or more routers 130, the one or more network switches 140, the communication server 150, or the security appliance 160. The switching and distribution layers 120 can include one or more routers (not shown).

The router(s) 130 can be connected to a network 135 or the Internet by a communication link 10. If a security scanning analysis is generated by a security analyzer (not shown) that is located outside of the network system 100, such as, for example, on a software vendor server on the Internet, the security scanning analysis can be received via the router 130 or directly by the security appliance 160 via a communication link 10. The network 135 can be located on an intranet, behind a firewall. The router(s) 130 can include a firewall (not shown). The network switch(es) 140 can be connected to one or more client devices 142 by one or more associated communication links 10. The network switch(es) 140 can include ethernet switches. Data packets can be securely transported between devices in the network system 100.

The communication server 150 can include a standards-based computing system that can operate as a carrier-grade common platform for a wide range of communications applications and facilitate communication over, for example, the PSTN 155 or the PLMN (not shown). The communication server 150 can include Internet message handling services (MHS) that transfer electronic mail messages between communicating devices in the network system 100 with communicating devices external to the network system 100. The MHS can include, for example, a message transfer agent or mail transfer agent (MTA), a mail relay, or the like. The communication server 150 can include a message delivery agent (MDA). The network system 100 can be connected to the Internet over one or more communication links 10.

Figure 2:
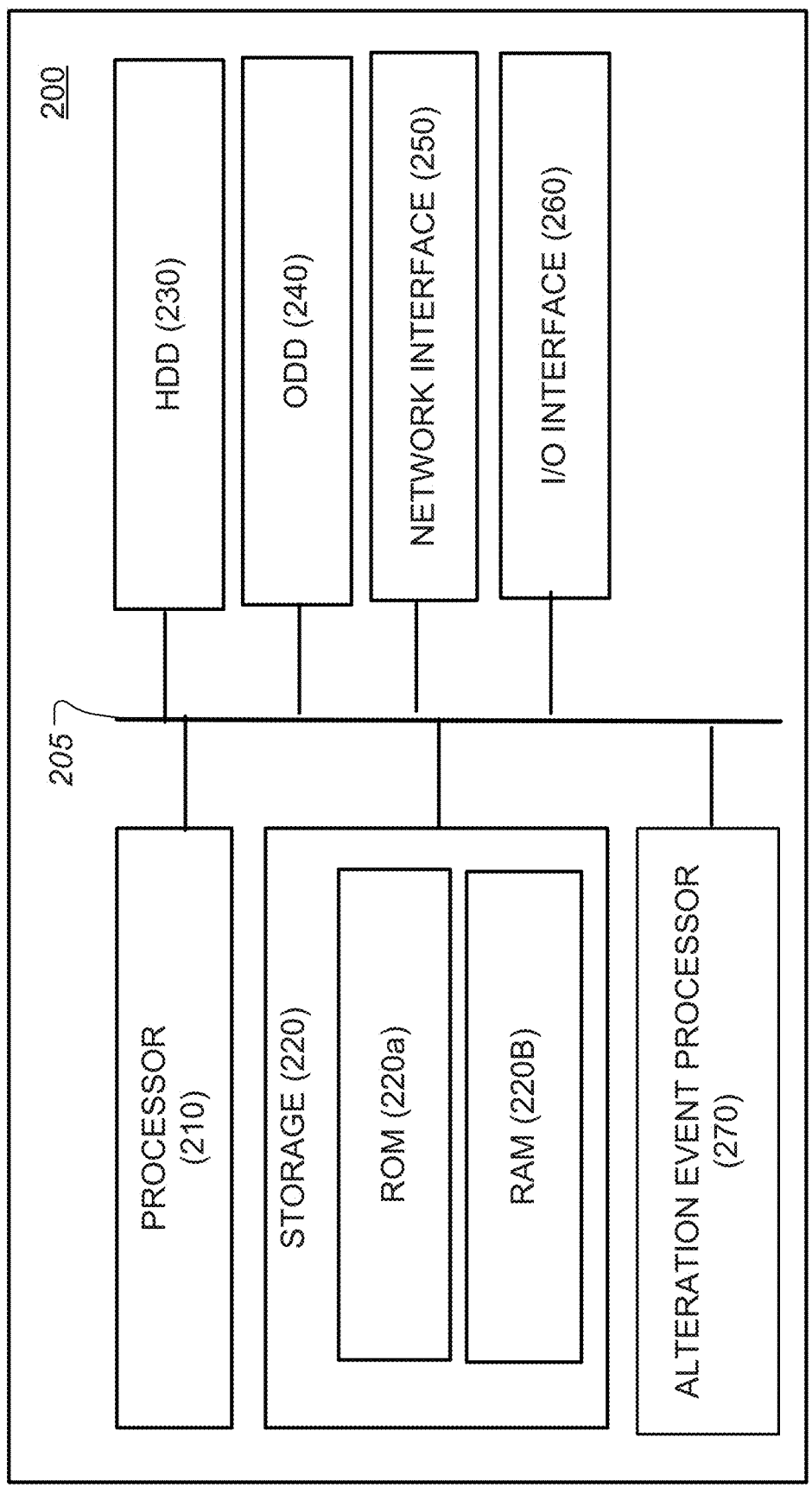
FIG. 2 shows an example of a processing unit that can be included in a security appliance in the network system shown in FIG. 1.

FIG. 2 shows an embodiment of a processing unit 200 that can be included in, for example, the security appliance 160 (shown in FIG. 1). The processing unit 200 can be configured to implement the various aspects of the disclosure. The processing unit 200 includes a processor 210, a storage 220, a hard disk drive (HDD) 230, an optical disk drive (ODD) 240, a network interface 250, an input/output (I/O) interface 260, an alteration event processor 270, and a system bus 205 that can be communicatively linked to each of the components in the processing unit 200 by a communication link.

The system bus 205 can be any of several types of bus structures that can further interconnect to a memory bus (with or without a memory controller), a peripheral bus, and a local bus using any of a variety of commercially available bus architectures.

The processor 210 can be any of various commercially available processors. Dual microprocessors and other multi-processor architectures can also be employed as the processor.

The processing unit 200 includes a computer-readable medium that can hold executable or interpretable computer code (or instructions) that, when executed by the processor 210, causes the steps, processes and methods described herein to be carried out. The computer-readable medium can be provided in the storage 220, HDD 230, or ODD 240. The computer readable medium can include sections of computer code that, when executed by the processor 210 and/or the alteration event processor 270, cause the processing unit 200 to carry a process 500 shown in FIG. 5, as well as all other process steps described or contemplated herein.

The storage 220 includes a read only memory (ROM) 220A and a random access memory (RAM) 220B. The storage 220 can store alteration event data and indexing data that links the stored alteration event data to an associated security scanning analysis and/or computing resource. A basic input/output system (BIOS) can be stored in the non-volatile memory 220A, which can include, for example, a ROM, an EPROM, an EEPROM, or the like. The BIOS can contain the basic routines that help to transfer information between components within the processing unit 200, such as during start-up. The RAM 220B can include a high-speed RAM such as static RAM for caching data.

The HDD 230 can include, for example, an enhanced integrated drive electronics (EIDE) drive, a serial advanced technology attachments (SATA) drive, or the like; and, the ODD 240 can read/write from/to a CD-ROM disk (not shown), or, read from or write to other high capacity optical media such as the DVD. The HDD 230 can be configured for external use in a suitable chassis (not shown). The HDD 230 and ODD 240 can be connected to the system bus 205 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The HDD 230 and/or ODD 240, and their associated computer-readable media, can provide nonvolatile storage of data, data structures, computer-executable instructions, and the like. The HDD 230 and/or ODD 240 can accommodate the storage of any data in a suitable digital format. The storage 220, HDD 230, and/or ODD 240 can include one or more apps that are used to execute aspects of the architecture described herein.

A number of program modules can be stored in the HDD 230, ODD 240, and/or RAM 220B, including an operating system (not shown), one or more application programs (not shown), other program modules (not shown), and program data (not shown). Any (or all) of the operating system, application programs, program modules, and program data can be cached in the RAM 220B as executable sections of computer code.

The network interface 250 can be connected to the network 135 or the Internet (shown in FIG. 1). The network interface 250 can include a wired or a wireless communication network interface (not shown) and/or a modem (not shown). When used in a local area network (LAN), the processing unit 200 can be connected to the LAN network (e.g., network 135, shown in FIG. 1) through the wired and/or wireless communication network interface; and, when used in a wide area network (WAN), the processing unit 200 can be connected to the WAN network through the modem. The network 135 (shown in FIG. 1) can include a LAN, a WAN, or the like. The modem (not shown) can be internal or external and wired or wireless. The modem can be connected to the system bus 205 via, for example, a serial port interface (not shown).

The (I/O) interface 260 can receive commands and data from an operator via the I/O interface, which can be communicatively coupled to one or more input/output devices, including, for example, a keyboard (not shown), a mouse (not shown), a pointer (not shown), a microphone (not shown), a speaker (not shown), a display (not shown), and/or the like. The received commands and data can be forward to the processor 210 from the I/O interface 260 as instruction and data signals via the bus 205.

The alteration event processor 270 can be a device or a module that is separate from the processor 210, as seen in FIG. 2, or it can be integrated with the processor 210. The alteration event processor 270 can be connected to the system bus 205 and configured to receive at an input (not shown) a security scanning analysis from a security analyzer (not shown). The alteration event processor 270 can receive, for example, the security scanning analysis 400 shown in FIGS. 4A-4L, which in the illustrated example includes a UNIX file-based security scanning analysis. Alternatively, the alteration event processor 270 can receive any security scanning analysis, including those that are not UNIX-based or UNIX file-based. The instant disclosure is not limited to any particular type of security scanning analysis.

As seen in FIG. 4A, the UNIX file-based security scanning analysis 400 can include a plurality of security scan results, which can include, among other things, a DATE field, a LINE_TOTAL field, a TOTAL_FILES field, a TOTAL_FINDINGS field, a TOTAL_HIGH_FINDING field, a TOTAL_HIGH_HIGH_FINDING field, a TOTAL_HIGH_MED_FINDING field, a TOTAL_HIGH_LOW_FINDING field, a VUL.SUM field, a VKLOC field, a V-DENSITY field, a TOTAL_EXCLUDED_FINDING field, an EXCLUDE field, among other security scan results commonly found in UNIX file-based vulnerability reports generated by security analyzers.

Figure 3:
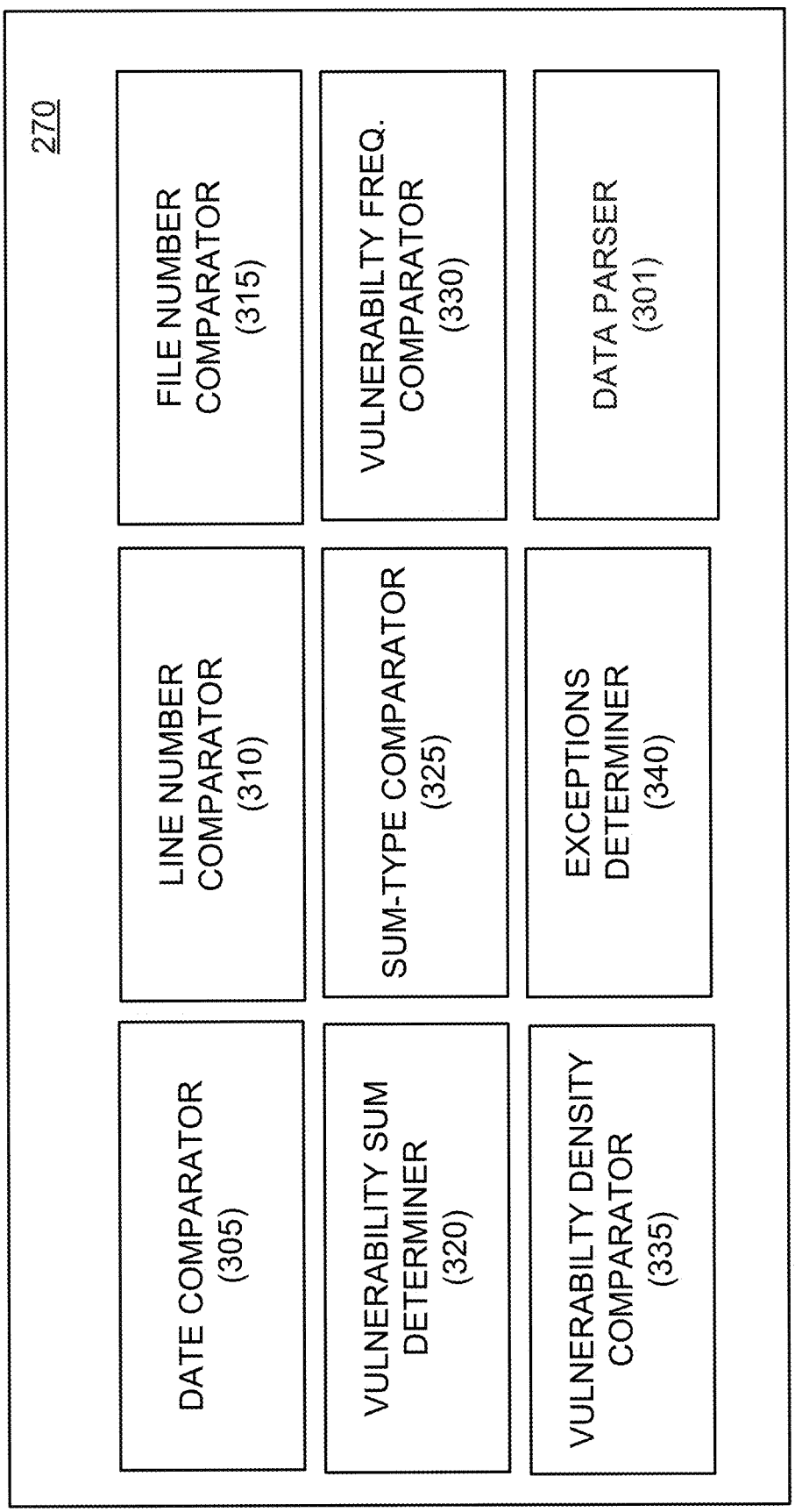
FIG. 3 shows an example of an alteration event processor that can be included in the processing unit in FIG. 2.

FIG. 3 shows an example of the alteration event processor 270 that is constructed according to the principles of the disclosure. The event processor 270 can include a data parser 301, a date comparator 305, a line number comparator 310, a file number comparator 315, a vulnerability sum determiner 320, a sum-type comparator 325, a vulnerability frequency comparator 330, a vulnerability density comparator 335, and an exceptions determiner 340, each of which can be a device or a module that is separate from the processor 210 (shown in FIG. 2), or which can be integrated with the processor 210.

The data parser 301 can receive the security scanning analysis and parse data, including security scan results data, from a plurality of fields in the security scanning analysis, including fields containing date data, total number of lines scanned data, total number of files scanned data, total number of findings data, breakdown of findings data, vulnerability frequency data, vulnerability density data, vulnerability summary data, excluded findings data, among other security scan results data commonly found in UNIX file-based vulnerability reports generated by security analyzers. The parsed data can be forwarded to other components in the alteration vent processor 270.

The date comparator 305 can receive date data in a date field (e.g., the DATE field shown in FIG. 4A) in the received security scanning analysis 400 and compare the received date value with date data in one or more other fields in the security scanning analysis 400. For example, the date comparator 305 can compare the received date value with a configurable threshold date. For instance, in the UNIX file-based security scanning analysis 400, in the "AssessmentStat" tag, the date fields in can be checked and validated. The threshold date can be set to a specific date or range of dates. For instance, the threshold date can be set so as to ensure that the received date value is not too old.

For example, the data value can be set to a date value that is six (6) months earlier than the date on which the security scanning analysis 400 is received by the alteration event processor 270. The date value can be the date on which the source code in the computing resource was scanned by a security analyzer (not shown). If the date value is earlier than or equal to the threshold value, or if the date value differs from the date value determined in one or more additional fields in the security scanning analysis 400, the date comparator 305 can determine that an alteration event has occurred and store alteration event data associated with the alteration event. The alteration event data can include, for example, the location of each suspect security scan result, the threshold date value, the particular fields analyzed, or the like.

The line number comparator 310 can receive data in the received security scanning analysis 400 that describes the number of lines of source code scanned by the security analyzer (e.g., data in the TOTAL_LINES field, shown in FIG. 4B) and compare the received number of scanned lines value to a line number threshold. The line number threshold can be set to 0 or any positive integer value. In the UNIX file-based security scanning analysis 400, the TOTAL_LINES field data can include the total number of lines of source code in the computing resource scanned by the security analyzer (not shown), and data in the LINE_TOTAL field in the "AssessmentStat" tag can be checked and validated to confirm that the value is not equal to, for example, 0. If the received line number value is equal to, or is less than the line number threshold value (e.g., equal to 0), the line number comparator 310 can determine that an alteration event has occurred and store alteration event data associated with the alteration event.

Additionally (or alternatively), the line number comparator 310 can compare the received line number value against the total number of scanned lines identified in the security scanning analysis 400. For example, in the UNIX file-based security scanning analysis 400, the total number of scanned lines can be provided again in the last "Message" tag in the security scanning analysis 400, as shown in FIG. 4D. If the received line number value is different from the total number of scanned lines provided in the "Message" tag, the line number comparator 310 can determine that an alteration event has occurred and store alteration event data associated with the alteration event.

The file number comparator 315 can receive the file number data in the received security scanning analysis 400 (e.g., data in the TOTAL_FILES field, shown in FIG. 4C) and compare the received file number value to a total file number threshold. The total file number threshold can be set to 0 or any positive integer value. The received file number value (e.g., in the TOTAL_FILES field, shown in FIG. 4C) can refer to the total number of files of source code in the computing resource scanned by the security analyzer (not shown). In the UNIX file-based security scanning analysis 400, in the "AssessmentStat" tag, the LINE_FILES field(s) can be checked and validated to confirm that the value is not equal to, for example, 0. The file number comparator 315 can validate that the total file number value does not equal the file number threshold (e.g., 0). If the file comparator 315 determines that the received total file number value is equal to the file number threshold (e.g., equal to 0), the file number comparator 315 can determine that an alteration event has occurred and store alteration event data associated with the alteration event.

Additionally (or alternatively), the file number comparator 315 can compare the received file number value against the total number of scanned files identified in the security scanning analysis 400. For example, in the UNIX file-based security scanning analysis 400, the total number of scanned files can be provided again in the last "Message" tag, as shown in FIG. 4D. If the received file number value is different from the total number of scanned files provided in the "Message" tag, the file number comparator 315 can determine that an alteration event has occurred and store alteration event data associated with the alteration event.

The vulnerability sum determiner 320 can receive the security scan results and evaluate the security scan results against a breakdown of the security scan results to determine whether a match exists. For example, referring to FIG. 4E, in the UNIX file-based security scanning analysis 400, the vulnerability sum determiner 320 can access data in each of the TOTAL_FINDINGS field, the TOTAL_HIGH_FINDING field, the TOTAL_HIGH_HIGH_FINDING field, the TOTAL_HIGH_MED_FINDING field, and the TOTAL_HIGH_LOW_FINDING field, and determine whether the value in TOTAL_HIGH_FINDING field (e.g., "73" shown in FIG. 4E) is equal to the sum of the value in the TOTAL_HIGH_HIGH_FINDING field (e.g., "0" shown in FIG. 4E) plus the value in the TOTAL_HIGH_MED_FINDING field (e.g., "0" shown in FIG. 4E) plus the value in the TOTAL_HIGH_LOW_FINDING field (e.g., "73" shown in FIG. 4E). In the illustrated example in FIG. 4E, the vulnerability sum determiner 320 can determine that an alteration event has not occurred, since the calculated sum of values in the TOTAL_HIGH_FINDING-related fields (e.g., 73=0+0+73) indicates no alteration event. However, if the vulnerability sum determiner 320 determines that the sum of the values in the security scan results does not match (or equal) the breakdown of the security scan results, the vulnerability sum determiner 320 can determine that an alteration event has occurred and store alteration event data associated with the alteration event.

The sum-type comparator 325 can receive and evaluate data in the security scan summary data fields (e.g., aggregated data in "FindingDataPool" tag, shown in FIG. 4F) and compare the received data against associated data fields (e.g., aggregated data in "AssessmentStat" tag, shown in FIG. 4F) to determine whether the received data matches the data in the associated data fields. For example, referring to FIG. 4F, in the UNIX file-based security scanning analysis 400, the sum-type comparator 325 can analyze the data fields in the "FindingDataPool" tag and compare the received data against the aggregated data in the "AssessmentStat" tag. In this example, the findings in the "FindingDataPool" tag should match the summary in the "AssessmentStat" tag—a mismatch can indicate that an alteration event has occurred and the sum-type comparator 325 can store alteration event data associated with the alteration event. In the UNIX file-based security scanning analysis 400 (shown in FIG. 4F), the "FindingDataPool" can contain security scan results identifying all of the vulnerabilities and weaknesses detected by the security analyzer during scanning of the computing resource for which the security scanning analysis 400 were generated, including, for example, severity, category, vulnerability type, file name, line number, file number, and the like.

The vulnerability frequency comparator 330 can receive the data in the vulnerability frequency data field (e.g., data in the VKLOC or MAX_VKLOC fields, shown in FIG. 4G), calculate a vulnerability frequency value from other related data in the security scanning analysis 400 and compare the calculated vulnerability frequency value against other vulnerability frequency data in the security scan results to determine whether a match exists. For example, in the UNIX file-based security scanning analysis 400 (shown in FIG. 4G), the VKLOC refers to the number of vulnerabilities per 1000 lines of scanned source code, and the data value is included in the "AssessmentStat" tag (shown in FIG. 4G) and calculated and included in the last "Message" tag (shown in FIG. 4H). The vulnerability frequency comparator 330 can calculate a vulnerability frequency value for the security scan results and compare the calculated value against the data in the vulnerability frequency data fields VKLOC and/or MAX_VKLOC in the "AssessmentStat" tag (e.g., "1.190118" shown in FIG. 4G) and the data in the vulnerability frequency data field VKLOC in the "Message" tag (e.g., "1.190118" shown in FIG. 4H). If a mismatch is detected in these fields, the vulnerability frequency comparator 330 can determine that an alteration event has occurred and store alteration event data associated with the alteration event.

The vulnerability density comparator 335 can receive the data in the vulnerability density data field(s) (e.g., VDENSITY or MAX_VDENSITY fields, shown in FIG. 4I), calculate a vulnerability density value from other related data in the security scan results and compare the received data against the calculated vulnerability density value to determine whether a match exists. For example, in the UNIX file-based security scanning analysis 400 (shown in FIG. 4I), the VDENSITY fields includes a vulnerability density value that refers to the severity of the identified vulnerabilities in the scanned source code. The vulnerability density comparator 335 can access the data in, for example, the VDENSITY and MAX_VDENSITY fields in the "AssessmentStat" tag (shown in FIG. 4I) and the data in the V-DENSITY field in the last "Message" tag (shown in FIG. 4J). If a mismatch is detected between the calculated vulnerability density value and the data in the VDENSITY and/or MAX_VDENSITY fields (e.g., "11.066847" in FIG. 4I) and/or the V-DENSITY field (e.g., "11.066847" in FIG. 4J), the vulnerability density comparator 335 can determine that an alteration event has occurred and store alteration event data associated with the alteration event.

The exceptions determiner 340 can receive the data in the total excluded findings field (e.g., the data in the TOTAL_EXCLUDED_FINDINGS field, shown in FIG. 4K) and compare the received value to an exceptions threshold, which can be set to, for example, 0. The total excluded findings field includes a value that indicates the total number of exceptions identified by a security analyzer during the security scanning of the source code in the computing resource. In the UNIX file-based security scanning analysis 400, in the "AssessmentStat" tag, the data in the TOTAL_EXCLUDED_FINDINGS field can be checked to determine whether the value is equal to the exceptions threshold (e.g., "0" in FIG. 4K). If the value in the TOTAL_EXCLUDED_FINDINGS field is not equal to the exceptions threshold, the exceptions determiner 340 can determine that an alteration event has occurred and store alteration event data associated with the alteration event.

The exceptions determiner 340 can also go through all of the exclude fields in the security scanning analysis 400 and check whether an exclude attribute (e.g., "TRUE") has been set. For example, in the UNIX file-based security scanning analysis 400 (shown in FIG. 4L), the "FindingDataPool" tag can contain data regarding all vulnerabilities or weaknesses detected in the computing resource for which the security scanning analysis 400 was generated, including, for example, severity, category, vulnerability type, file name, line number, file number, and the like, as discussed above. The "FindingDataPool" tag can also include an EXCLUDE field, which can be checked by the exceptions determiner 340 to determine whether the field has been set to "TRUE" (e.g., EXCLUDE=TRUE in FIG. 4L). The exceptions determiner 340 can go through all fields that include data relating to findings details in the security scanning analysis 400 and check each occurrence of the EXCLUDE field to determine whether it has been set to "TRUE." If an EXCLUDE field is set to TRUE, this can mean that the associated finding was excluded from the total findings results, in which case the exceptions determiner 340 can determine that an alteration event has occurred and store alteration event data.

Figure 5:
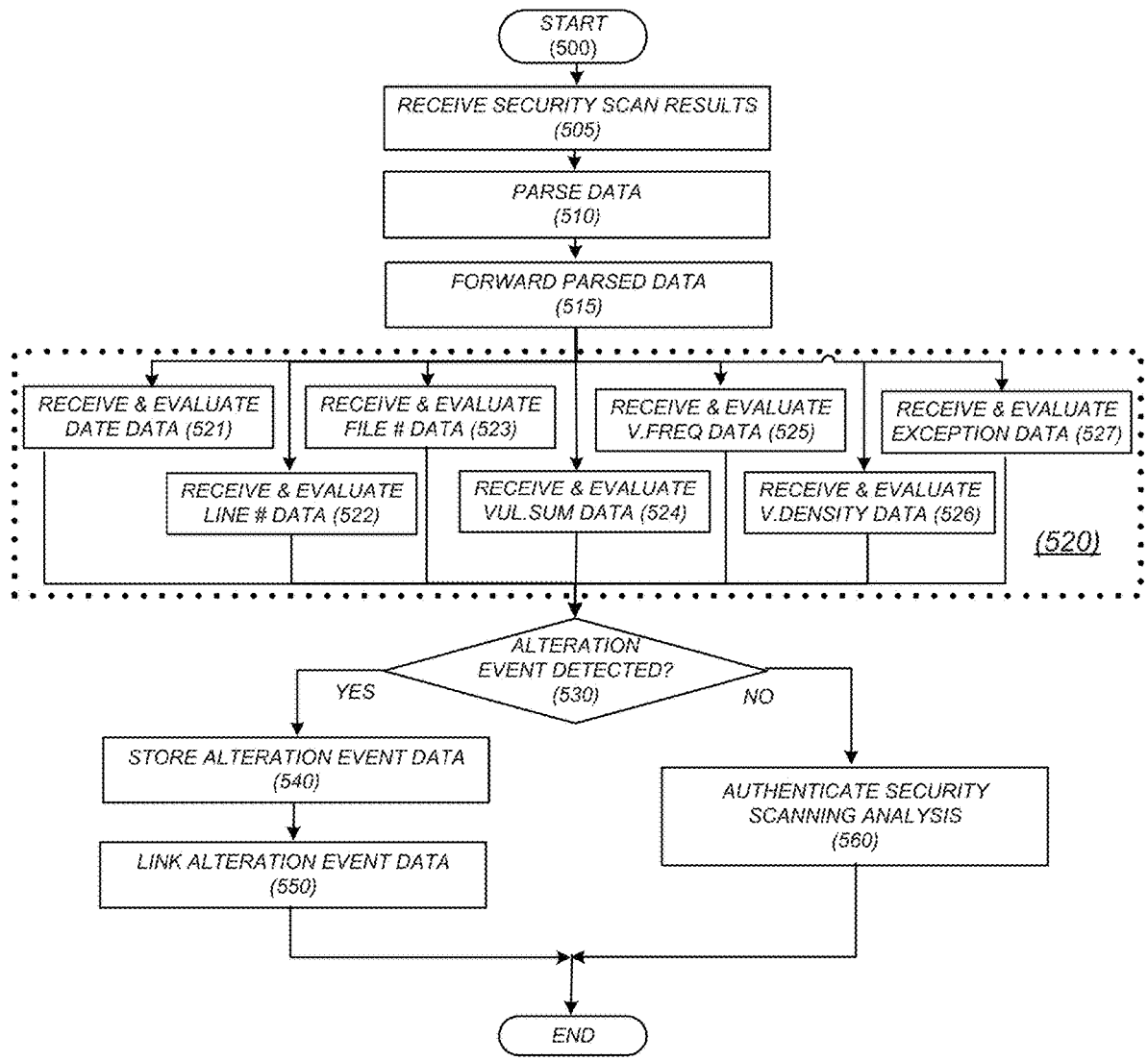
FIG. 5 shows an example of an alteration event detection process, according to the principles of the disclosure.

FIG. 5 shows an example of an alteration event detection process 500, according to the principles of the disclosure. The alteration event detection process 500 can be carried out by the alteration event processor 270 (shown in FIG. 2). The alteration event processor 270 can include or can access a computer readable medium that contains a computer program, which, when executed on one or more of computing devices, cause the process 500 to be carried out. The computer program can be tangibly embodied in the computer readable medium, comprising one or more program instructions, code segments, or code sections for performing each of the steps in the process 500 shown in FIG. 5, when executed by the one or more computing devices.

Referring to a non-limiting example, the UNIX file-based security scanning analysis 400 (shown in FIGS. 4A-4L) can be received by the alteration event processor 270 (shown in FIG. 2) from a security analyzer (not shown) that has performed a security scan on a computing resource and detected one or more vulnerabilities or weaknesses in the computing resource, as seen in FIGS. 4A-4L (Step 505). The security analyzer (not shown) can include, for example, one or more static application security testing (SAST) tools. The security analyzer (not shown) can be located in the security appliance 160 (shown in FIG. 1), or external to the network system 100, such as, for example, on a software vendor server, in which case the security scanning analysis 400 can be received over the Internet. The various security scan results in the numerous data fields in the received security scanning analysis 400 can be parsed by the data parser 301 (shown in FIG. 3) into date data, total lines scanned data, total files scanned data, total findings data, security scan summary data (e.g., vulnerability information, including severity, category, vulnerability type, file name, line number, etc.), vulnerability frequency data, vulnerability density data, exceptions data, and the like (Step 510) and forwarded to, for example, appropriate components 305 to 340 in the alteration event processor 270 (shown in FIG. 3) (Step 515), where the parsed data can be evaluated to determine whether an alteration event has occurred (Step 520).

According to a non-limiting example of the alteration event detection process 500, the UNIX file-based security scanning analysis 400 (shown in FIGS. 4A-4L) can be received and data parsed from the various security scan results data fields, including fields in the "AssessmentStat" tag, "FindingDataPool" tag, "Message" tag, among others. The fields can include, for example, a DATE field, a LINE_TOTAL field, a TOTAL_FILES field, a TOTAL_FINDINGS field, a TOTAL_HIGH_FINDING field, a TOTAL_HIGH_HIGH_FINDING field, a TOTAL_HIGH_MED_FINDING field, a TOTAL_HIGH_LOW_FINDING field, a VUL.SUM field, a VKLOC field, a MAX_VKLOC field, a V-DENSITY field, a TOTAL_EXCLUDED_FINDING field, an EXCLUDE field, etc.

The parsed date data (e.g., data received from the DATE field in the security scanning analysis 400, shown in FIG. 4A) can be received by the date comparator 305 and compared against date data in one or more additional date fields in the security scanning analysis 400, or against a configurable threshold date (Step 521). If it is determined that the date value is not within the threshold value (for example, the date value is greater than or equal to the threshold date), or if the date value differs from a date value in one or more other fields in the security scanning analysis 400, a determination can be made that an alteration event has occurred in the security scan results (YES at Step 530) and alteration event data associated with the alteration event can be stored (Step 540).

The parsed line number data (e.g., data received from the TOTAL_LINES field in the security scan results, shown in FIG. 4B) can be received by the line number comparator 310 and compared against a predetermined line number threshold (Step 522). The line number threshold can be set to 0 or any positive integer value. The line number data can include the total number of lines of source code in the computing resource that were scanned by the security analyzer (not shown) to generate the security scanning analysis 400. For example, in the UNIX file-based security scanning analysis 400, in the "AssessmentStat" tag, the data in the LINE_TO-TAL field can be checked and validated, such as, for example, to confirm that the value is not equal to 0. The line number comparator 310 can validate that line number value in the parsed line number data does not equal or is greater than the line number threshold (e.g., 0). If the line number value is equal to, or less than the line number threshold value (e.g., equal to 0), a determination can be made that an alteration event has occurred (YES at Step 530) and alteration event data associated with the alteration event can be stored (Step 540).

The line number comparator 310 can access one or more fields having line number data in the security scanning analysis 400, as shown in FIG. 4D, and compare the value in each field to the value received in the parsed data. For example, in the UNIX file-based security scanning analysis 400, the total number of scanned lines can be provided again in the last "Message" tag in the security scan results, as shown in FIG. 4D. If the received line number value is different from the line number value in the "Message" tag, a determination can be made that an alteration event has occurred (YES at Step 530) and alteration event data associated with the alteration event can be stored (Step 540).

The parsed file number data (e.g., data received from the TOTAL_FILES field in the security scanning analysis 400, shown in FIG. 4C) can be received by the file number comparator 315 and compared against a predetermined total file number threshold (Step 523). The total file number threshold can be set to 0 or any positive integer value. The data in the TOTAL_FILES field can include a value that represents the total number of files of source code in the computing resource scanned by the security analyzer (not shown) to generate the security scanning analysis 400. For example, in the UNIX file-based security scanning analysis 400, in the "AssessmentStat" tag, the data in the TOTAL_FILES field can be checked and validated, such as, for example, to confirm that the value is not equal to the total file number threshold (e.g., 0). If the received total number of files value is equal to (or less than) the total file number threshold, a determination can be made that an alteration event has occurred (YES at Step 530) and alteration event data associated with the alteration event can be stored (Step 540).

The file number comparator 315 can receive data from one or more fields that contain data related to the number of scanned files in the security scanning analysis 400, as shown in FIG. 4D, and compare the received value in each instance to the value received from the TOTAL_FILES field. For example, in the UNIX file-based security scanning analysis 400, the total number of scanned files can be provided again in the last "Message" tag in the security scan results, as shown in FIG. 4D. If the received total number of files value differs from the total number of files value in the last "Message" tag, a determination can be made that an alteration event has occurred (YES at Step 530) and alteration event data associated with the alteration event can be stored (Step 540).

The parsed total findings data (e.g., data received from the TOTAL_FINDINGS field, the TOTAL_HIGH_FINDING field, the TOTAL_HIGH_HIGH_FINDING field, the TOTAL_HIGH_MED_FINDING field, and the TOTAL_HIGH_LOW_FINDING field in the security scan results shown in FIG. 4E) can be received by the vulnerability sum determiner 320 and evaluated against a breakdown of the security scan results to determine whether a match exists (Step 524). For example, referring to FIG. 4E, in the UNIX file-based security scanning analysis 400, the vulnerability sum determiner 320 can access each of security scan results, including the TOTAL_FINDINGS field, the TOTAL_HIGH_FINDING field, the TOTAL_HIGH_HIGH_FINDING field, the TOTAL_HIGH_MED_FINDING field, and the TOTAL_HIGH_LOW_FINDING field, and determine whether the value in TOTAL_HIGH_FINDING field (e.g., "73" shown in FIG.

4E) is equal to the sum of the value in the TOTAL_HIGH_HIGH_FINDING field (e.g., "0" shown in FIG. 4E) plus the value in the TOTAL_HIGH_MED_FINDING field (e.g., "0" shown in FIG. 4E) plus the value in the TOTAL_HIGH_LOW_FINDING field (e.g., "73" shown in FIG. 4E). In the illustrated example in FIG. 4D, the vulnerability sum determiner 320 may determine that an alteration event has not occurred because a determination is made that the values in the TOTAL_HIGH_FINDING-related fields (e.g., 73=0+0+73) indicate the absence of an alteration event. However, if the vulnerability sum determiner 320 determiners that the sum of security scan results does not match (or equal) the breakdown of the security scan results, a determination can be made that an alteration event has occurred (YES at Step 530) and alteration event data associated with the alteration event can be stored (Step 540).

The parsed summary data (e.g., security scan results data received from one or more fields in the "FindingDataPool" tag in the security scanning analysis 400, shown in FIG. 4F) can be received by the sum-type comparator 325 and evaluated and compared against other data fields in the security scanning analysis 400 to determine whether (i) the total number of identified security scan results (or vulnerabilities) matches the breakdown of the security scan results (or vulnerabilities) in the security scanning analysis 400, and/or (ii) a summary of the analyzed security scan results (e.g., severity, category, vulnerability type, file name, line number, file number, etc.) matches a summary of the security scan results in other fields in the security scanning analysis 400 (e.g., compare aggregated data in "FindingDataPool" tag against aggregated data in "AssessmentStat" tag) (Step 524). For example, referring to FIG. 4F, in the UNIX file-based security scanning analysis 400, the sum-type comparator 325 can receive data from each of the data fields in the "FindingDataPool" tag and compare the received data against the aggregated data in the "AssessmentStat" tag. In this example, the number of findings in the "FindingDataPool" tag should match the number of findings in the summary in the "AssessmentStat" tag, and, if the sum-type comparator 325 determines a mismatch in the numbers of findings, a determination can be made that an alteration event has occurred (YES at Step 530) and associated alteration event data can be stored (Step 540).

The "FindingDataPool" tag can contain security scan results that detail all vulnerabilities and weaknesses detected in the computing resource for which the security scanning analysis 400 was generated, including, for example, severity, category, vulnerability type, file name, line number, file number, and the like. If the sum-type comparator 325 determines a mismatch between the data in the fields in, for example, the "FindingDataPool" tag with the summary data in the "AssessmentStat" tag, a determination can be made that an alteration event has occurred (YES at Step 530) and alteration event data associated with the alteration event can be stored (Step 540).

The parsed vulnerability frequency data (e.g., data received from the VKLOC and/or MAX_VKLOC fields in the security scan results, shown in FIG. 4G) can be received by the vulnerability frequency comparator 330. The vulnerability frequency comparator 330 can calculate a vulnerability frequency value from data in other related fields in the security scan results and compare the calculated vulnerability frequency value against the received vulnerability frequency data to determine whether a match exists. For example, in the UNIX file-based security scanning analysis 400 (shown in FIG. 4G), the value in the VKLOC field can refer to the number of vulnerabilities per 1000 lines of source code in the computing resource that were scanned by the security analyzer. This VKLOC field can be found in the "AssessmentStat" tag (shown in FIG. 4G) and in the last "Message" tag (shown in FIG. 4H). The vulnerability frequency comparator 330 can calculate a vulnerability frequency value for the security scan results based on the received data. The vulnerability frequency comparator 330 can compare the received (or calculated) vulnerability frequency value against the data in the VKLOC and/or MAX_VKLOC fields in the "AssessmentStat" tag (e.g., "1.190118" shown in FIG. 4G) and/the data in the VKLOC field in the "Message" tag (e.g., "1.190118" shown in FIG. 4H). If the vulnerability frequency comparator 330 determines a mismatch in these values, a determination can be made that an alteration event has occurred (YES at Step 530) and the associated alteration event data can be stored (Step 540).

The parsed vulnerability density data (e.g., data received from the VDENSITY and/or MAX_VDENSITY fields in the "AssessmentStat" tag, shown in FIG. 4I) can be received by the vulnerability density comparator 335 and a vulnerability density value calculated from data in other related fields in the security scanning analysis 400, which the vulnerability density comparator 335 can use to compare the received data against the calculated vulnerability density value to determine whether a match exists (Step 526). For example, in the UNIX file-based security scanning analysis 400 (shown in FIG. 4I), the data in the VDENSITY field (shown in FIG. 4I) refers to the severity of the identified vulnerabilities in the source code in the computing resource scanned by the security analyzer (not shown) in generating the security scanning analysis 400. The vulnerability density comparator 335 can compare the data in the MAX_VDENSITY field in the "AssessmentStat" tag (shown in FIG. 4I) and the data in the V-DENSITY field in last "Message" tag (shown in FIG. 4J), and, if the vulnerability density comparator 335 determines a mismatch, a determination can be made that an alteration event has occurred (YES at Step 530) and associated alteration vent data can be stored (Step 540).

In the example illustrated in FIGS. 4I and 4J, the vulnerability density comparator 335 can determine that a match in the data exists, since the vulnerability density value in the MAX_VDENSITY field (e.g., "11.066847" in FIG. 4I) matches the vulnerability density value in the V-DENSITY field (e.g., "11.066847" in FIG. 4J), in which case a determination can be made that an alteration event has not occurred (NO at Step 530).

The parsed excluded findings data (e.g., data received from the EXCLUDED_FINDINGS field in the "AssessmentStat" tag, shown in FIG. 4K) can be received by the exceptions determiner 340 and compared against an exceptions threshold, which can be set to, for example, 0 (Step 527). The exceptions determiner 340 can also go through all of exceptions fields in the security scanning analysis 400 and check whether an exclude attribute (e.g., TRUE) has been set (Step 527). If the exceptions determiner 340 finds that the value in the TOTAL_EXCLUDED_FINDINGS field is not equal to the exceptions threshold, or one or more EXCLUDE fields are set to TRUE, a determination can be made that an alteration event has occurred (YES at Step 530) and the associated alteration event data stored (Step 540).

For example, in the UNIX file-based security scanning analysis 400 (shown in FIG. 4L), the "FindingDataPool" tag can contain security scan results fields populated with detailed information regarding all vulnerabilities and weaknesses detected in the source code in the computing resource during scanning by the security analyzer (not shown) to generate the security scanning analysis 400, including, for example, severity data, category data, vulnerability type data, file name data, line number data, file number data, and the like. The data in the TOTAL_EXCLUDED_FINDINGS field can include the total number of exceptions identified by a security analyzer during scanning of the source code. The exceptions determiner 340 can access the data in the TOTAL_EXCLUDED_FINDINGS field in the "AssessmentStat" tag and determine whether the value is equal to the exceptions threshold (e.g., "0" in FIG. 4K). The exceptions determiner 340 can also access the data in the EXCLUDE field in the "FindingDataPool" tag and determine whether the field has been set to "TRUE" (e.g., EXCLUDE=TRUE, shown in FIG. 4L). Regarding the latter, the exceptions determiner 340 can go through all fields that contain findings details and check each EXCLUDE field to determine whether it has been set to "TRUE." If the exceptions determiner 340 finds that (i) the value in the TOTAL_EXCLUDED_FINDINGS field is not equal to the exceptions threshold, or it finds that (ii) one or more EXCLUDE fields are set to TRUE, a determination can be made that an alteration event has occurred (YES at Step 530) and the associated alteration event data stored (Step 540).

If the alteration event processor 270 (shown in FIGS. 2 and 3), after receiving and analyzing the security scanning analysis 400 (Step 520), does not detect any alteration events (NO at Step 530), then the security scanning analysis 400 can be authenticated and the related computing resource can be made available for release to the client devices 142 (Step 560). Authentication data for the computing resource can be stored for historical purposes or later access. The Step 520 can include Steps 521 to 527, discussed above.

On the other hand, if the alteration event processor 270 detects one or more alteration events (YES at Step 530), then the associated alteration event data can be stored (Step 540) and linked to the computing resource (Step 550) before the computing resource can be made available to, for example, the client devices 142 in the network system 100.

The security scanning analysis 400 can be forwarded together with the alteration event data to the client device 142 (shown in FIG. 1) for further investigation and/or remediation. The alteration event data and computing resource can be forwarded for remediation, including, for example, fixing or patching all alteration events, or vulnerabilities or weaknesses in the computing resource, which can be carried out by, for example, security appliance 160 (shown in FIG. 1), or by a security analyst via the client device 142 (shown in FIG. 1).

The terms "a," "an," and "the," as used in this disclosure, means "one or more," unless expressly specified otherwise.

The term "alteration event," as used in this disclosure, means an incident or act involving or related to a change or alteration made to or tampering with a security scan (or vulnerability) result received from a security analyzer. "Alternation event" can include an inconsistency in or a sign of tampering with a security scan result.

The term "alteration event data," as used in this disclosure, means data that includes one or more data fields and that provides information about a particular alteration event, including, but not limited to, for example, the related security scan result, a location of the security scan result, the type of alteration event (e.g., a value has been altered, an inconsistency is identified, etc.), a potential fix for the alteration event, a potential patch for the alteration event, or any other information that can facilitate identification of an alteration event, the location(s) of the alteration event, a basis for determining the alteration event has occurred, a fix or patch for the alteration event, or the like.

The term "client device," as used in this disclosure, means a computer or a communicating device that is configured to operate in the network system 100, including sending and receiving data and instructions signals over one or more communication links.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation. The communicating device can be portable or stationary.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, WiFi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computing resource," as used in this disclosure, means software, a software application, a web application, a web page, a computer application, a computer program, computer code, machine executable instructions, firmware, or the like.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, Bluetooth, or the like.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, a network model or the like. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A method for analyzing a security scanning analysis for source code in a computing resource to detect an alteration event in the security scanning analysis, the method comprising:

receiving, by an alteration event processor, the security scanning analysis for the computing resource;

parsing data, by the alteration event processor, from a plurality of fields in the security scanning analysis;

analyzing the parsed data, by the alteration event processor, to detect whether the security scanning analysis includes an alteration event;

determining, by the alteration event processor, that the security scanning analysis includes the alteration event; and linking, by the alteration event processor, the alteration event with the computing resource before the computing resource is made available to a client device in a network, wherein the analyzing the parsed data comprises one or more of:

a) receiving a total lines scanned value from the parsed data, and comparing the total lines scanned value to a line number threshold to detect the alteration event, b) receiving a total files scanned value from the parsed data, and comparing the total files scanned value to a file number threshold to detect the alteration event, c) receiving at least one of the total lines scanned value and the total files scanned value from the parsed data, accessing at least one of total lines scanned data and total files scanned data in a field in the security scanning analysis, and comparing the total lines scanned value or the total files scanned value to the total lines scanned data or the total files scanned data, respectively, to detect the alteration event, and d) receiving a total findings value from the parsed data, and comparing the total findings value to a breakdown of one or more security scan results in the security scanning analysis to detect the alteration event, e) receiving an excluded findings value from the parsed data, and comparing the excluded findings value to an exceptions threshold to detect the alteration event, and f) checking data in each exclusion field in the security scanning analysis, and detecting the alteration event based on the checked data comprising an exclusion attribute, wherein the exclusion attribute includes a TRUE setting.

2. The method of claim 1, wherein the analyzing the parsed data comprises:
receiving a date value from the parsed data;
comparing the date value to a threshold value to detect the alteration event.

3. The method of claim 1, wherein the analyzing the parsed data comprises:
receiving summary data from the parsed data; and
comparing the summary data to a breakdown of one or more security scan results in the security scanning analysis to detect the alteration event.

4. The method of claim 1, wherein the analyzing the parsed data comprises:
receiving a vulnerability frequency value from the parsed data;
retrieving vulnerability frequency data from a field in the security scanning analysis; and
comparing the vulnerability frequency value to the vulnerability frequency data in the security scanning analysis to detect the alteration event.

5. The method of claim 1, wherein the analyzing the parsed data comprises:
receiving a vulnerability density value from the parsed data;
retrieving vulnerability density data from a field in the security scanning analysis; and
comparing the vulnerability density value to the vulnerability density data in the security scanning analysis to detect the alteration event.

6. A system that analyzes a security scanning analysis for source code in a computing resource to detect an alteration event in the security scanning analysis, the system comprising:
an alteration event processor that:
receives the security scanning analysis for the computing resource;
parses security scan results data from a plurality of fields in the security scanning analysis;
analyzes the security scan results data;
detects whether the security scanning analysis includes an alteration event;
generates alteration event data for a detected alteration event; and
links the alteration event data with the computing resource before the computing resource is made available to a client device in a network,
wherein the alteration event processor comprises one or more of:
a line number comparator that receives a total lines scanned value from the parsed data and compares the total lines scanned value to a line number threshold or data in a field in the security scanning analysis to detect the alteration event,
a field number comparator that receives a total fields scanned value from the parsed data and compares the total files scanned value to a file number threshold or data in a field in the security scanning analysis to detect the alteration event,
a vulnerability sum determiner that receives a total findings value from the parsed data and compares the total findings value to a breakdown of one or more security scan results in the security scanning analysis to detect the alteration event, and
an exceptions determiner that receives an excluded findings value from the parsed data or that checks data in each exclusion field in the security scanning analysis, wherein the exceptions determiner compares the excluded findings value to an exceptions threshold or detects an exclusion attribute to detect the alteration event, and wherein the exclusion attribute is set to TRUE.

7. The system of claim 6, wherein the alteration event processor comprises a date comparator that receives a date value from the parsed data and compares the date value to a threshold value to detect the alteration event.

8. The system of claim 6, wherein the alteration event processor comprises a sum-type comparator that receives summary data from the parsed data and compares the summary data to a breakdown of one or more security scan results in the security scanning analysis to detect the alteration event.

9. The system of claim 6, wherein the alteration event processor comprises a vulnerability frequency comparator that receives a vulnerability frequency value from the parsed data and compares the vulnerability frequency value to vulnerability frequency data in a field in the security scanning analysis to detect the alteration event.

10. The system of claim 6, wherein the alteration event processor comprises a vulnerability density comparator that receives a vulnerability density value from the parsed data and compares the vulnerability density value to vulnerability density data in a field in the security scanning analysis to detect the alteration event.

* * * * *